J. D. RASEY.
LEVEL.
APPLICATION FILED AUG. 6, 1913.
1,128,361.
Patented Feb. 16, 1915.
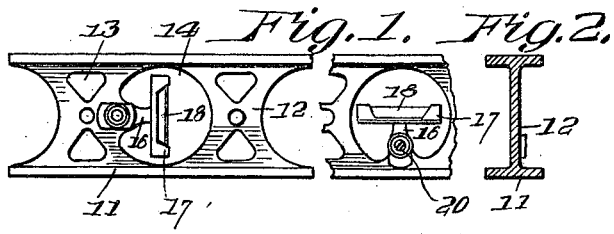
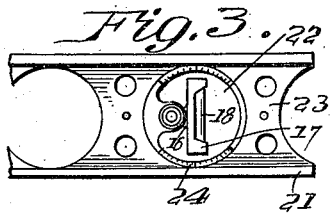
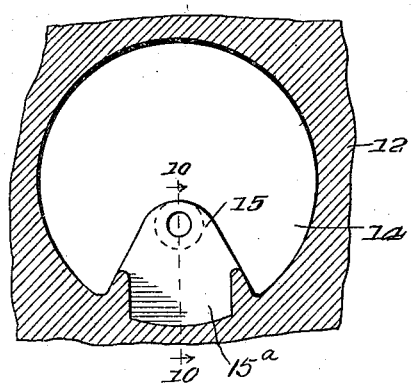
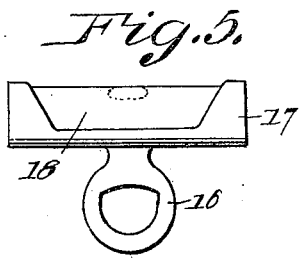
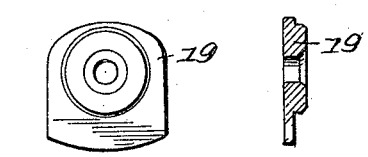
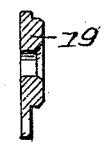
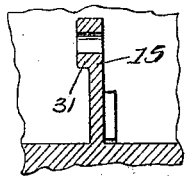
Witnesses
Inventor,
John D. Rasey
by Franks. Aupleman,
Attorney

UNITED STATES PATENT OFFICE.

JOHN D. RASEY, OF OSHKOSH, WISCONSIN.

LEVEL.

1,128,361. Specification of Letters Patent. Patented Feb. 16, 1915.

Application filed August 6, 1913. Serial No. 783,335.

*To all whom it may concern:*

Be it known that I, JOHN D. RASEY, a citizen of the United States of America, and resident of Oshkosh, in the county of Winnebago and State of Wisconsin, have invented certain new and useful Improvements in Levels, of which the following is a specification.

This invention relates to spirit levels and an object of the invention is to provide means for retaining the glass for holding the liquid in position whereby the said glass is adjustable, and in the provision of graduations with relation to which the glass is movable in order that the angle of inclination of the glass may be determined for the purpose of insuring a proper reading of the position of the surface to which the level is applied.

A further object of this invention is to provide a level preferably of aluminum which is comparatively light and of sufficient strength to prevent distortion of any part thereof, thus producing a durable and efficient level and one which, as stated, is comparatively light.

A still further object of this invention is to produce a modified level or attachment therefor, whereby the glass for containing the liquid may be secured to a wooden stock or body thus making the invention in part applicable to levels now in common use.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a leveling instrument embodying the invention; Fig. 2 illustrates a cross sectional view thereof; Fig. 3 illustrates a view in elevation of a fragment of the leveling instrument embodying a modification; Fig. 4 illustrates a view in elevation, partly in section of a fragment of a stock; Fig. 5 illustrates a view in elevation of a glass for containing liquid and a holder for said glass; Fig. 6 illustrates a view in elevation of a clip for retaining the glass holder in place; Fig. 7 illustrates a sectional view of the said clip; and Fig. 8 illustrates a sectional view on the line 10—10 of Fig. 4.

In these drawings 11 denotes the stock or body which is of an I beam construction as shown in Fig. 2, the web 12 of which is provided with a series of apertures 13 for the purpose of reducing the weight of the implement and the said web having a series of apertures 14 in which are secured the glass and glass holders. The web at each aperture 14 is provided with a lug 15 having a seat or recess 15ª adapted to receive the shank 16 of the glass holder 17, the said holder containing the usual glass, being usually designated as a bulb glass. The recess 15ª forms shoulders which act as bearings for the shank 16 of the glass holder. As shown in the drawing, the shank 16 is designed to be seated in the recess 15ª and secured in place by the clip 19 which clip is fastened in place by a screw 20 or other securing member but it is the wish of the inventor that he be not limited to the details of construction with respect to these features.

As shown in Fig. 3, which, as stated, is regarded as a slight modification, the body 21 has an aperture 22 for the reception of the glass holder and the web 23 is provided with graduations 24, so that the operator may observe the position of the glass holder.

The movement of the glass holder with respect to the body or stock is afforded by reason of the adjustable character of the clip 19 which may be released for the purpose of permitting movement of the said glass holder and may be resecured by a screw 20.

It is the purpose of the inventor to have the glasses detachable from the level, as stated, and adjustable on the level, the adjustment varying in the arc from 45° on one side to 45° on the other side, giving each end of the spirit glass or liquid holder a range of 90°.

As shown in the drawings, that portion of the web 12 containing the recess 15ª has a boss 31 on its outer surface for the purpose of strengthening the structure, the same corresponding to the boss on the clip 19, so that the fastening device used for securing the clip and the shank of the glass holder in place will have proper bearing and retaining surfaces.

As has been stated, it is the purpose of the inventor to make the metallic level or stock of aluminum with an alloy that will sufficiently harden it and to provide apertures in the clip thereof in such shape and in such relation to one another as to insure against distortion or twisting of the stock, due to change in temperature for it is well known that the usual metallic levels expand unduly and unequally when exposed to the sun or to heat and therefore, it is the purpose of this inventor to guard against such contingency.

I claim—

1. In a level, a stock comprising an I-beam, the web of which is provided with apertures, lugs integral with the web and extending into the apertures, each of said lugs having an aperture therein, and each of said lugs having a recess forming shoulders spaced apart, a clip in the space between the shoulders and engaged by said shoulders, glass holders, each having a shank, interposed between a lug and a clip, and a securing device for each lug and clip for binding a shank of a glass holder therebetween.

2. In a level, a stock having apertures therein, integral lugs projecting into the apertures, said lugs having shoulders extending laterally thereof, said shoulders being spaced apart, a clip lying in the space between the shoulders, said clips and lugs having apertures, glass holders, each having a shank interposed between a lug and clip, said shank having an aperture adapted to aline with the apertures of the lug and clip and a fastener for retaining the glass holder in different positions of adjustment.

In testimony whereof, I hereunto affix my signature in the presence of two witnesses.

JOHN D. RASEY.

Witnesses:
G. T. BOYD,
C. M. GOODING.

Copies of this patent may be obtained for five cents each, by addressing the "Commissioner of Patents, Washington, D. C."